United States Patent [19]
Tomita et al.

[11] Patent Number: 4,978,136
[45] Date of Patent: Dec. 18, 1990

[54] AUTOMOTIVE KNEE PROTECTOR

[75] Inventors: Norihiro Tomita; Toshiteru Yoshimura, both of Aki; Masayuki Kotoh, Hiroshima; Masayosi Ono, Kure; Takayuki Kobayashi, Hiroshima; Katsunori Monden, Hiroshima, all of Japan

[73] Assignee: Mazda Motor Corporation, Hiroshima, Japan

[21] Appl. No.: 451,566

[22] Filed: Dec. 18, 1989

[30] Foreign Application Priority Data

Dec. 19, 1988 [JP] Japan .................. 63-318540
Dec. 24, 1988 [JP] Japan .................. 63-326482

[51] Int. Cl.⁵ ............................ B60R 21/04
[52] U.S. Cl. .................... 280/751; 280/752
[58] Field of Search ........... 280/751, 752, 750, 779

[56] References Cited

U.S. PATENT DOCUMENTS

| | | | |
|---|---|---|---|
| 4,194,782 | 5/1980 | Sudo | 280/751 |
| 4,518,172 | 5/1985 | Bortz et al. | 280/751 |
| 4,721,329 | 1/1988 | Brantman et al. | 280/751 |
| 4,834,422 | 5/1989 | Oikawa et al. | 280/751 |

FOREIGN PATENT DOCUMENTS 63-82851 4/1963 Japan .
57-32043 7/1982 Japan .
61-36434 10/1986 Japan .

*Primary Examiner*—Kenneth R. Rice
*Attorney, Agent, or Firm*—Fleit, Jacobson, Cohn, Price, Holman & Stern

[57] ABSTRACT

A knee protector structure provided facing knees of a passenger seated in a front seat of a vehicle for stopping a forward movement of the passenger by the knees to lighten a collision impact applied to the passenger comprising front body means for mounting a knee protector, protecting panel provided in the knee protector for being brought into contact with the knees in case of collision. The protecting panel has an upper panel portion and a lower panel portion. The lower panel portion having a rigidity smaller than the lower panel portion so that the lower panel portion is deformed greater than the upper panel portion when the knees are brought into contact with the knee protector in case of the collision.

25 Claims, 10 Drawing Sheets

AUTOMOTIVE KNEE PROTECTOR

BACKGROUND OF THE INVENTION

1. Field of the Invention

The present invention relates to an automotive knee protector for protecting knees of a passenger in a seat of a vehicle in case of collision of the vehicle.

2. Description of the Prior Art

There have been known some cases where the lower half of the passenger slips out of a seat belt to move forward undesirably in case of collision. In view of this, a vehicle has been proposed which is provided with a knee protector mounted on an instrument panel facing the passenger so that the passenger is protected from the undesirably forward movement in collision.

Conventionally, the knee protector is constituted by a metal plate and integrally mounted on a lateral frame which is disposed in a lateral direction of the vehicle for carrying the instrument panel wherein the knee protector faces the passenger seated in a front seat as shown in Japanese Utility Model Publication No. 61-36434, published on Oct. 22, 1986. The knee protector stops the forward, movement of the passenger resulted from the inertia at the time of collision and lightens an impact of the collision applied the knees of the passenger.

Japanese Utility Model Publication No. 57-32048, published on July 14, 1982, discloses similar knee protector.

Since an engine disposed in front of the passenger compartment is moved rearwardly relative to the passenger because of the collision, a lower portion of a dash panel partitioning the passenger compartment from the engine is also moved rearwardly to push up the knees of the passenger. As a result, the knees of the passenger are moved forwardly but upwardly so that the knee protector cannot cover the knees of the passenger properly.

SUMMARY OF THE INVENTION

It is therefore an object of the present invention to provide a structure of a knee protector which is reliable in case of a collision.

It is further object of the present invention to provide a knee protector which can protect knees of a passenger properly to lighten a collision impact.

It is still further object of the present invention to provide a knee protector which can prevent the knees of the passenger from moving upwardly in case of collision.

It is another object of the present invention to provide a front body structure which can absorb a collision impact properly to protect the passenger.

The above and other objects of the invention can be accomplished by a knee protector structure provided facing knees of a passenger seated in a front seat of a vehicle for stopping a forward movement of the passenger by the knees to lighten a collision impact applied to the passenger comprising front body means for mounting a knee protector, protecting panel means provided in the knee protector for being brought into contact with the knees in case of collision, the protecting panels means having an upper panel portion and a lower panel portion, the lower panel portion having a rigidity smaller than the lower panel portion so that the lower panel portion is deformed greater than the upper panel portion when the knees are brought into contact with the knee protector in case of the collision.

Preferably, the knee protector structure further comprises a stopper provided in the upper panel portion for preventing the knees from moving upward in case of collision.

According to the present invention, when the vehicle collides with an obstacle at the front portion thereof, the knee protector hits the knees of the passenger to be deformed, absorbing the collision energy. In this case, inasmuch as the knee protector is soft in rigidity at the lower portion, the lower portion is deformed greater than the upper portion. This effects that the knee protector restricts the knees of the passenger from an unduly upward movement by virtue of the upper portion thereof.

Alternatively, a stopper may be provided in the upper portion for restricting the unduly upward movement of the knees.

The above and other features of the present invention will be apparent from the following description taking reference to the accompanying drawings.

DESCRIPTION OF THE PREFERRED EMBODIMENT

Figure 1:
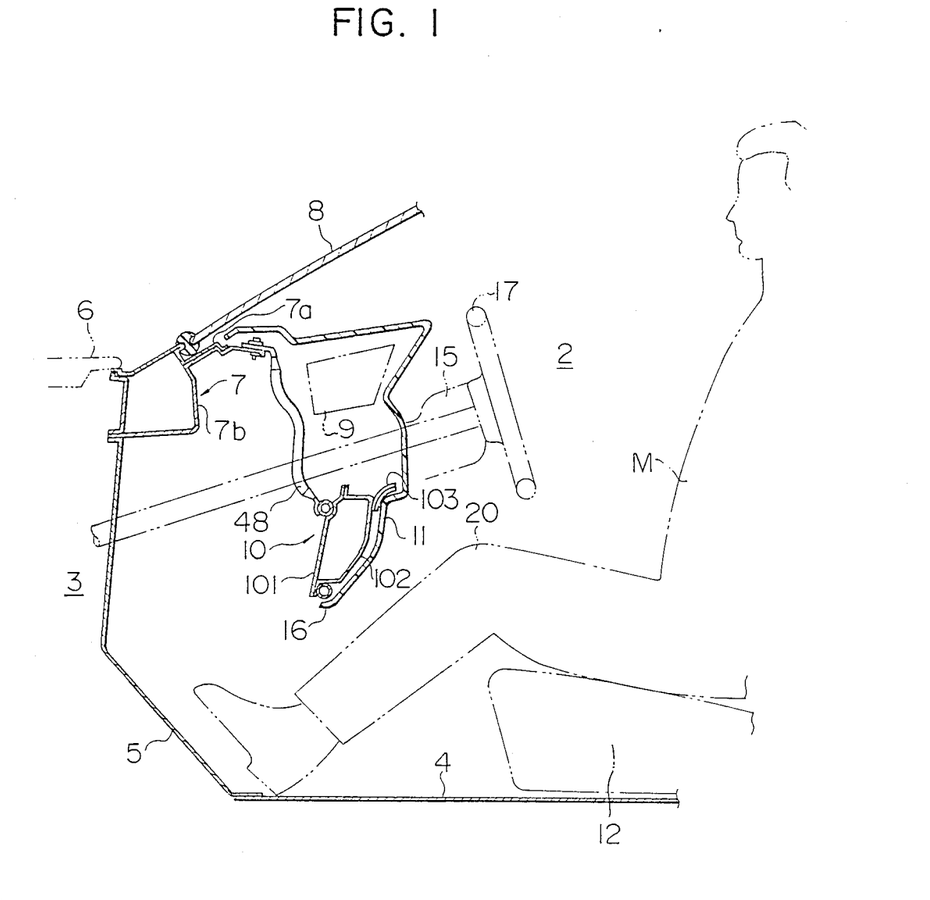
FIG. 1 is a sectional view showing inside of a passenger compartment of a vehicle to which the present invention can be applied.
Figure 2:
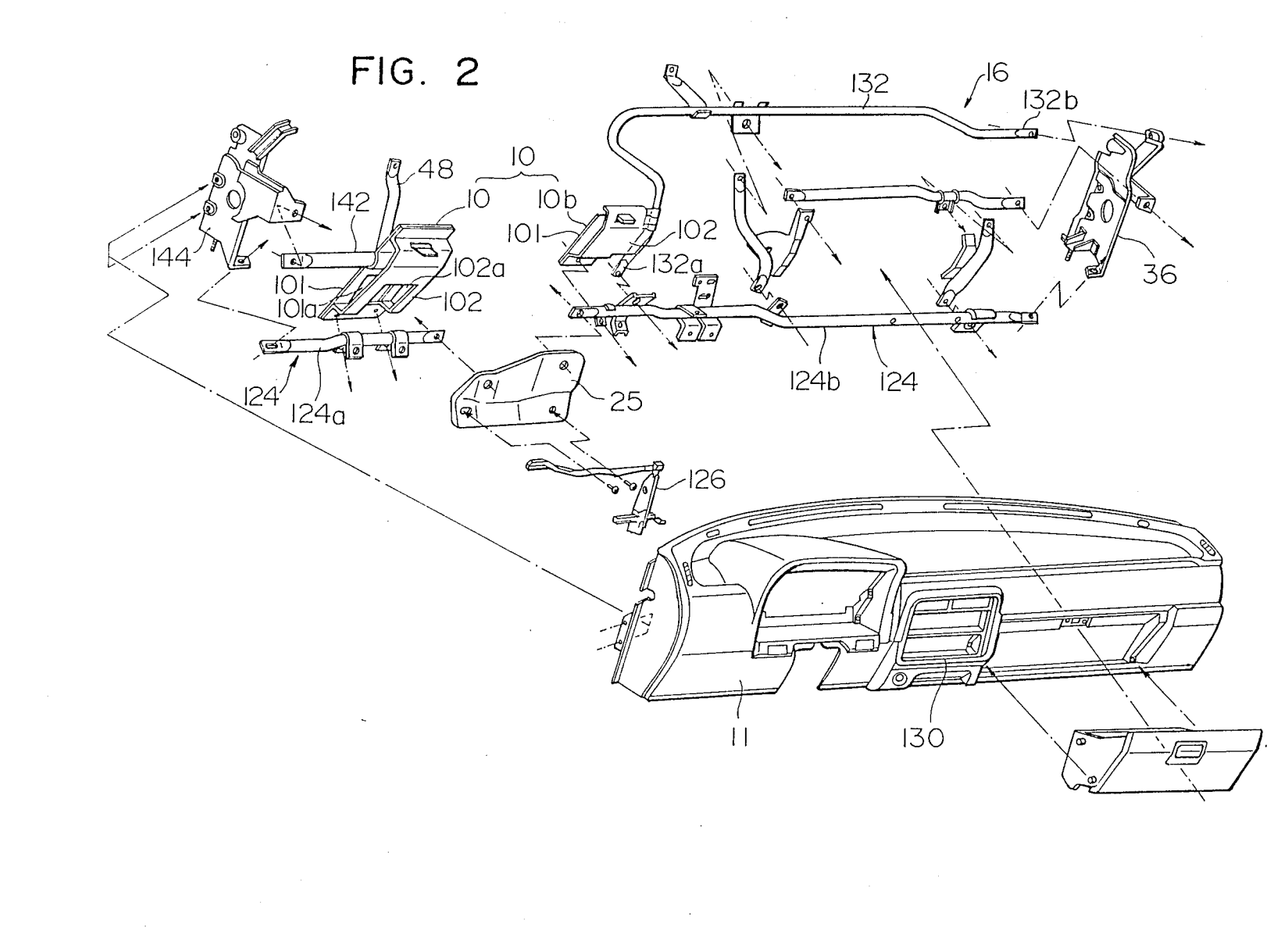
FIG. 2 is an exploded perspective view showing a front body structure on which a knee protector in accordance with present invention is mounted.

Referring to the drawings, specifically to FIGS. 1 and 2, there is shown an inside view of a passenger compartment 2 of a vehicle 1 to which the present invention can be applied. A vehicle front body structure which constitutes a part of the passenger compartment 2 is comprised of instrument panel 11 disposed facing a passenger M, a cowl box 7 comprised of a cowl upper panel 7a and a cowl lower panel 7b extending in a lateral direction of the vehicle, a front windshield glass 8 carried by the cowl upper panel 7a at a lower end. A dash lower panel 5 partitions the passenger compartment 2 from an engine room 3 which is covered by a bonnet 6. An instrument panel 11 for mounting instrument set 9 thereon is carried by the upper cowl panel 7a at an upper end. There is provided a knee protector 10 in front of a front seat 12 wherein the knee protector 10 faces knees of the passenger M seated on the seat 12.

The knee protector 10 is disposed behind the instrument panel 11 and incorporated into a pipe frame assembly 16. The protector 10 is constituted by a left protector 10a and a right protector 10b which are disposed opposite sides of a steering column 15 and faces a left and right knees 20 of the passenger M respectively to cover them at a collision as shown in FIG. 2.

A lower end of the instrument panel 11 is mounted on a lower pipe 124 of the pipe frame assembly 16. The lower pipe 124 extending laterally is divided into a left lower pipe 124a and right lower pipe 124b which are joined through a connecting member 25 so that an assembling work of the steering column 15 can be facilitated.

The connecting member 25 is of a metallic plate on which the lower pipes 124a and 124b are mounted at opposite upper corner portions of the member 25. A lower end of the connecting member is connected with an L-shaped bracket 126 which is joined with a tunnel portion (not shown) formed at a central portion of the floor panel 4.

The instrument panel 11 is carried by an upper pipe 132 of the pipe frame assembly 16 at a portion from a central console 130 to an assistant's seat. The upper pipe 132 is joint with the lower pipe 124a at a left and lower end in FIG. 2. The upper pipe 132 extends upwardly from the left and lower end, then forwardly and thereafter laterally toward the right hand along the upper cowl panel 7a. A right end 132b of the upper pipe 132 is connected with a cowl side panel (not shown).

Figure 6:
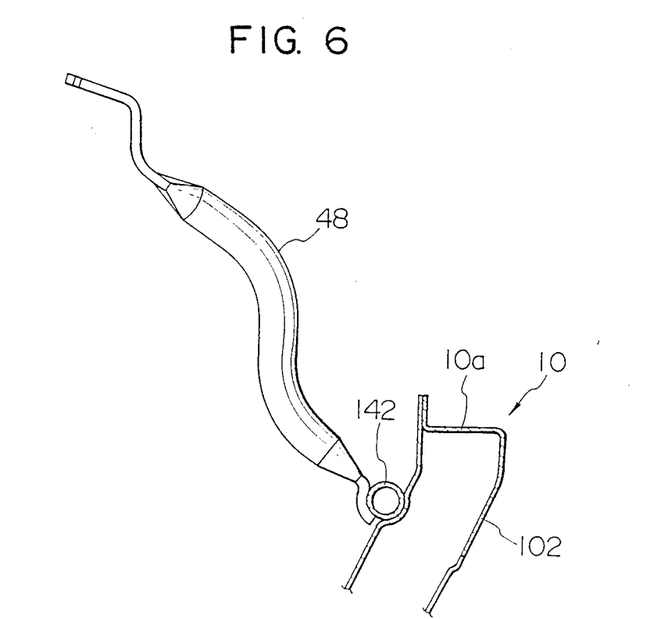
FIG. 6 is a sectional view taken along a line III—III in FIG. 3.

Each of the knee protectors 10a, 10b is constituted by rectangular metal plates 101 and 102 arranged in a spaced relationship and joined at an upper and lower ends with each other to form a three dimensional structure. The three dimensional structure extends substantially in parallel with the instrument panel. The right knee protector 10b is connected with a lower end portion of the upper pipe 132 by a welding or the like. The left knee protector 10b is connected with the left lower pipe 124b at a lower end and with a left upper pipe 142 at an upper end. The left upper pipe 142 and the left lower pipe 124b are joined with a cowl side panel (not shown) through a bracket 144. On the left upper pipe 142 is mounted a S-shaped pipe stay 48 extending up and down direction for connecting the left upper pipe 142 against with the cowl upper panel 7a as shown FIG. 1 and FIG. 6.

Figure 3:
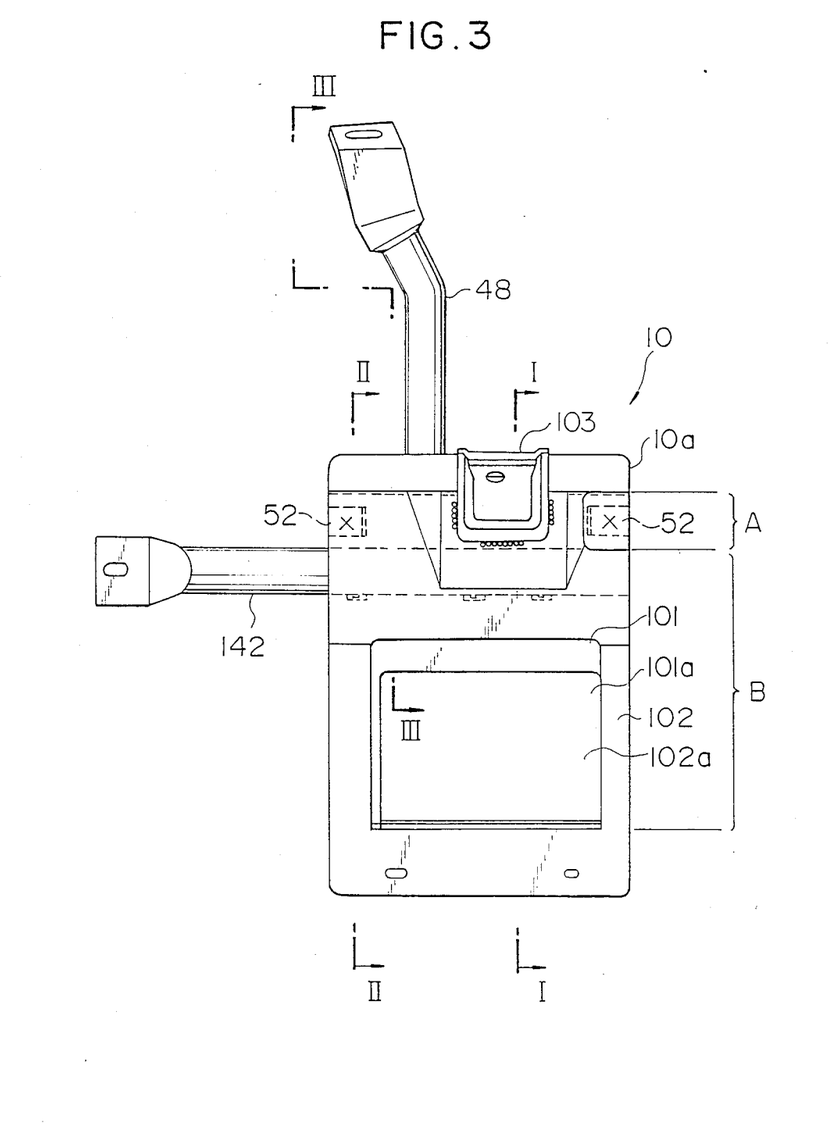
FIG. 3 is an elevational view of a knee protector in accordance with a preferred embodiment of the present invention.
Figure 4:
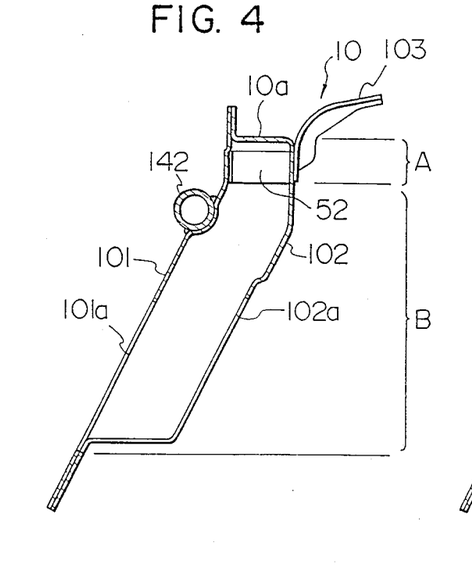
FIG. 4 is a sectional view the knee protector taken along a line I—I in FIG. 3.
Figure 5:
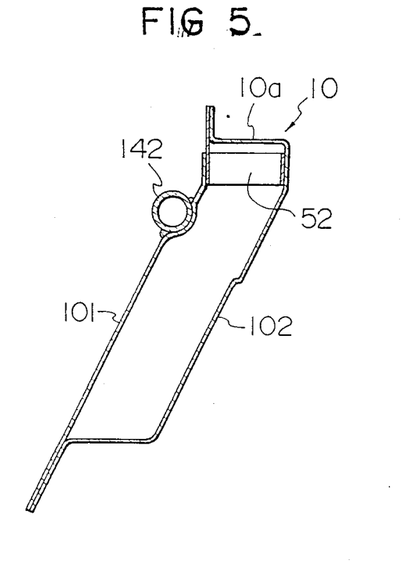
FIG. 5 is a sectional view taken along a line II—II in FIG. 3.

As shown in FIG. 3 through 5, the left knee protector 10a is formed with rectangular cut out portions 101a and 102a at lower portions of the panels 101 and 102 respectively. As a result, a lower portion A of the left knee protector 10a is lowered in rigidity comparinq with an upper portion B thereof. In addition, there is provided an L-shaped or arcuate stopper 103 mounted on the plate 102 at a position above the cut out portion 102a so as to cover the knee 20 of the passenger M in both the left and right knee protectors 10a and 10b not to slip the knee 20 out of the protectors 10a, 10b. Preferably, the stopper 103 is of a complimentary configuration of the knee 20. The upper portion A of the knee protector is provided with a pair of reinforcing stays 52 connecting the panels 101 and 102 above the cut out portion 101a and 102a behind the stopper 103 so that the upper portion A of the knee protector 10 is enhanced in rigidity.

In operation, in case of collision, the passenger M seated in the seat 12 is forced to move forward before he hits against the left and right knee protectors 10a and 10b through the instrument panel 11. As a result, the protector 10 is plastically deformed to absorb a collision energy through the knee 20 and prevents the passenger M from making a further forward movement.

As for the left knee protector 10a, the lower portion B thereof is easy to be deformed comparing with the upper portion A so that the knee 20 tends to dig under the knee protector 10a at the time of collision. In other words, the upper portion A of the left protector 10a effectively keeps the knee 20 underneath the protector 10 at the time of collision even an upward force acts on the legs of the passenger M. The stopper 103 can make sure by holding the knee 20 that the knee 20 is prevented from moving upwardly.

Alternatively, the lower portion B of the protector 10a can be constituted by a thinner plate than the upper portion A to provide the less rigidity. In another modification, the lower portion B may be provided a plurality of slits extending laterally to lower the rigidity.

Hereinafter, there is shown another embodiment of the present invention referring to FIGS. 7 through 13. Similar components to the former embodiment is represented by the same references as the former embodiment and a detailed explanation therefor is omitted. The steering column 15 in this embodiment is carried through a bracket 19 by a support member 21 extending laterally and mounted on cowl side panels 13 at opposite ends. The support member 21 is connected with a tunnel portion 4a formed on the floor panel 4 at a middle portion through a reinforcing stay 26. At a tip end of a steering shaft 15a is mounted a steering wheel 17 in which an air bag device 18 is installed in a folded condition. The air bag device 18 is inflated in association with a collision sensor to keep the upper body Mb of the passenger M off the front windshield glass 8 and the steering shaft 15a to protect the passenger.

A knee protector 30 is disposed behind the instrument panel 11.

Figure 7:
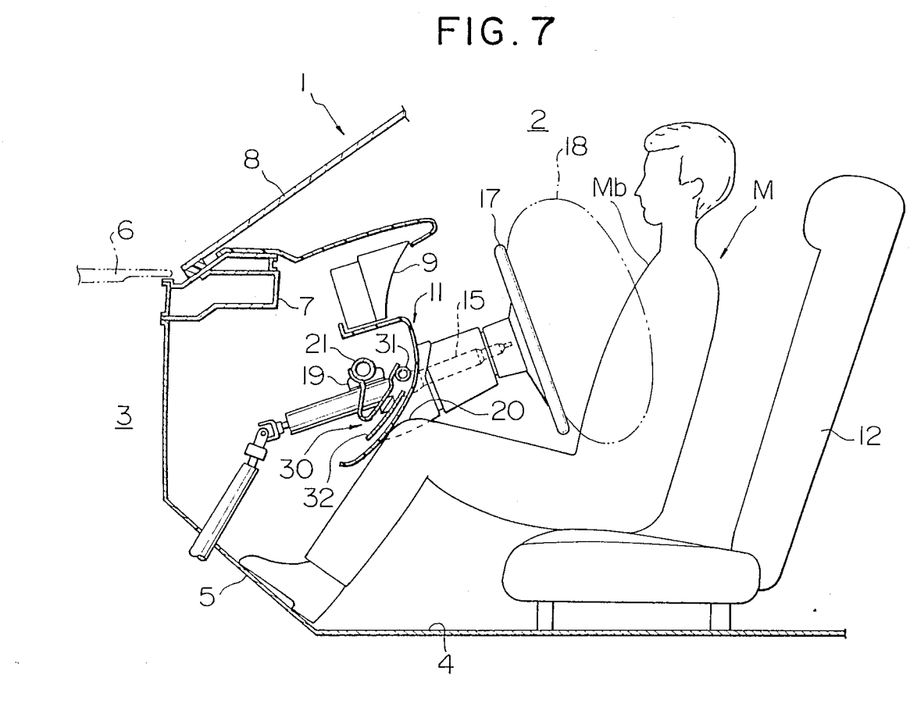
FIG. 7 is a sectional view similar to FIG. 1 but showing another embodiment of the present invention.
Figure 8:
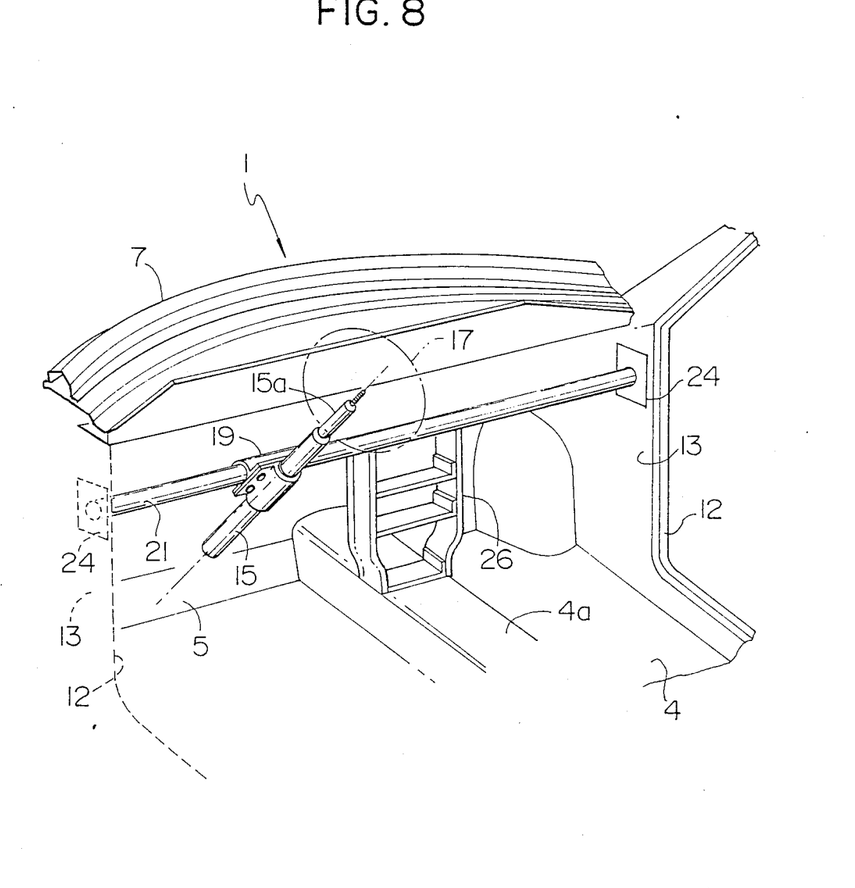
FIG. 8 is a perspective view of a passenger compartment according to the embodiment of FIG. 7.
Figure 9:
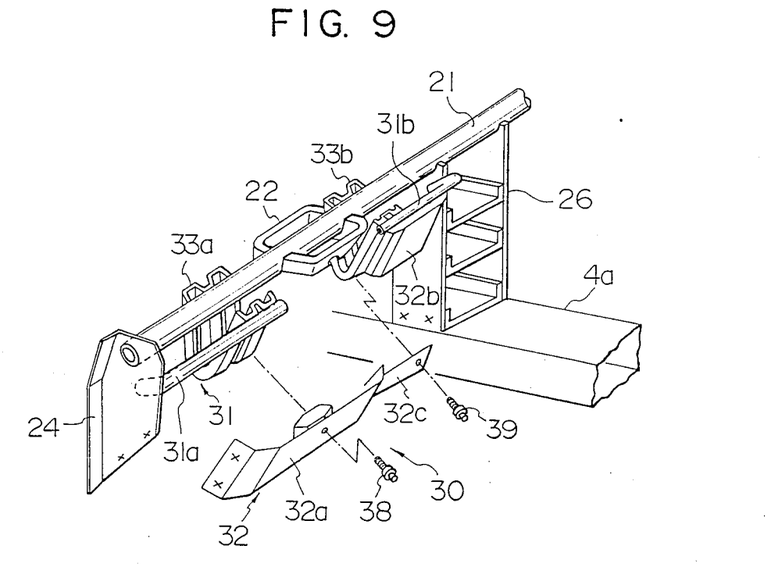
FIG. 9 is a perspective view showing a knee protector of the embodiment of FIG. 7.
Figure 10:
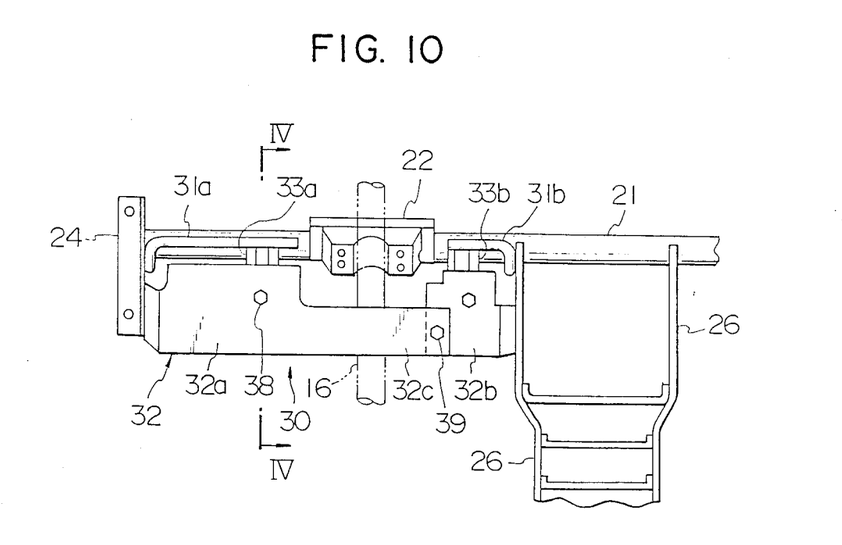
FIG. 10 is a plan view of the knee protector of FIG. 9.

The knee protector 30 is provided with a plate like protecting member 32 for receiving the knee 20, and a pipe like stopper member 31 disposed above the member 32 for restraining an upward movement of the knee 20 at the time of collision as shown in FIGS. 9 and 10. The protecting member 32 and the stopper member 31 are arranged substantially in parallel with the instrument panel 11 is the lateral direction of the vehicle with substantially the same distances to the panel 11 respectively as shown in FIG. 7.

The protecting member 32 is constituted by a left and right protecting members 32a and 32b, and an intermediate member formed at one end portion of the member 32a and connected with the member 32b. The stopper member 31 is constituted by a left and right members 31a and 31b disposed opposite sides of the steering column 15 to extend laterally.

One ends of the left protecting and stopper members 32a and 31a are fixed to a bracket 24 which is mounted on a left end of the support member 21. Right ends of the right protecting member 32b and the stopper member 31b are fixed to a side of the reinforcing stay 26.

The other ends (close to the steering column 15) of the stopper members 31a and 31b are fixed to one ends of a pair of V-shaped arm members 33a, 33b disposed opposite sides of the steering column 15. The other ends of the arm members 33a, 33b are fixed to the support member 21. In other words, the stopper members 31a, 31b are connected with the support member 21 through the arm members 33a, 33b.

Figure 11:
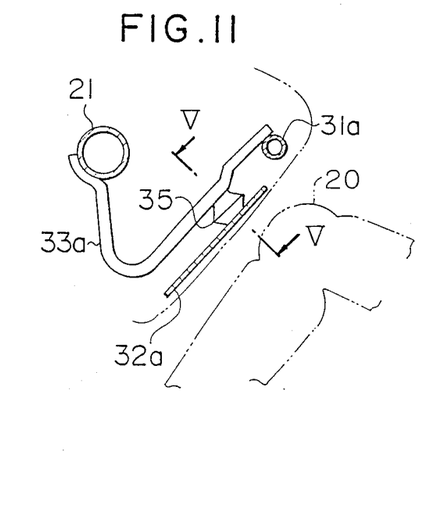
FIG. 11 is a schematic view taken along a line IV—IV in FIG. 10.
Figure 12:
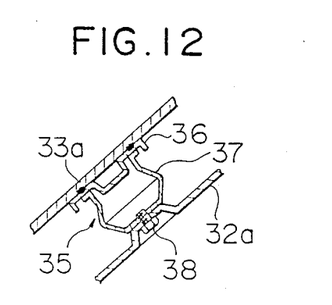
FIG. 12 is a schematic view taken along a line V—V in FIG. 11.

As shown in FIG. 11, each of the protecting members 32a, 32b is connected with the arms 33a, 33b through a shock absorbing member 35. The shock absorbing member 35 is constituted by press-molded members 36, 37 of metal, plastic and the like combined with each other. The member 37 is of a cup-like piece sit on disc-like member 36 as shown in FIG. 12. The shock absorbing member 35 is deformed by a compression to absorb an impact energy acting thereon to thereby lighten the impact against the knee 20.

The disc-like member 36 of the shock absorbing member 35 is fixed to the arm member 33a by welding and the cup-like member 37 is fixed on the member 36. The protecting member 32a is connected with a lower surface of the member 37 through a bolt device 38. In addition, the left protecting member 32a is connected with the right arm member 33b by means of a bolt device 39 as shown in FIG. 10.

Figure 13A:
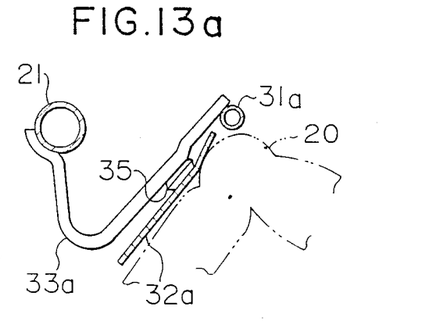
FIGS. 13a, 13b and 13c are schematic sectional views showing deformation of the knee protector in accordance with embodiment of FIG. 7.
Figure 13B:
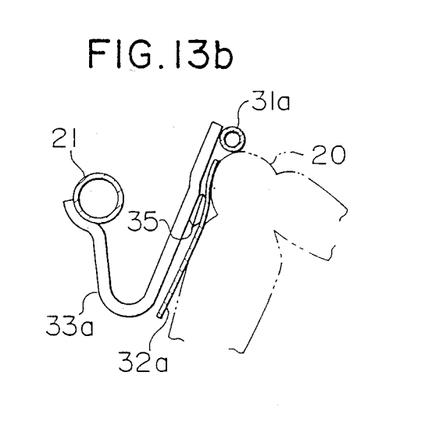
Figure 13C:
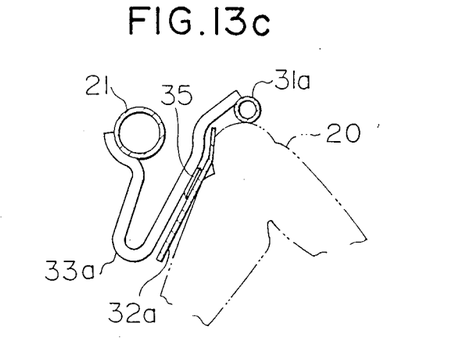

In operation, referring to FIGS. 13a through 13c, when the knee 20 is forced to be moved forwardly and to be hit the knee protector 30 in case of collision, the shock absorbing member 35 is compressed, absorbing an impact energy applied thereto so that the protecting member 32a is moved forwardly by a certain distance. As a result, the knee 20 is moved forwardly while compressing the shock absorbing member 35 to slip under the stopper member 31a. Thus, the knee 20 is prevented from moving upwardly by virtue of the stopper member 31a.

Furthermore, the arm member 33a is deformed by bending at the time of collision absorbing the impact energy. The arm member 33a is of a corrugated configuration in section to provide a relatively high rigidity so that the stopper member 31a is hardly displaced before the shock absorbing member 35 is deformed when subjected to a forward force in case of collision. Namely, the shock absorbing member 35 is deformed at first by a collision energy by a certain amount. Thereafter, the stopper member 31a starts to be displaced forwardly due to the deformation of the arm member 33a. Thus, the protecting member 32a is moved forwardly greater than the stopper member 31a. The protecting member 32b, stopper member 31b, and the arm member 33b function substantially the same way as the member 32a, 31a and 33a.

Hereinafter, there is described a further embodiment of the present invention taking reference with FIGS. 14 through 17b.

Figures 14, 15, 16:
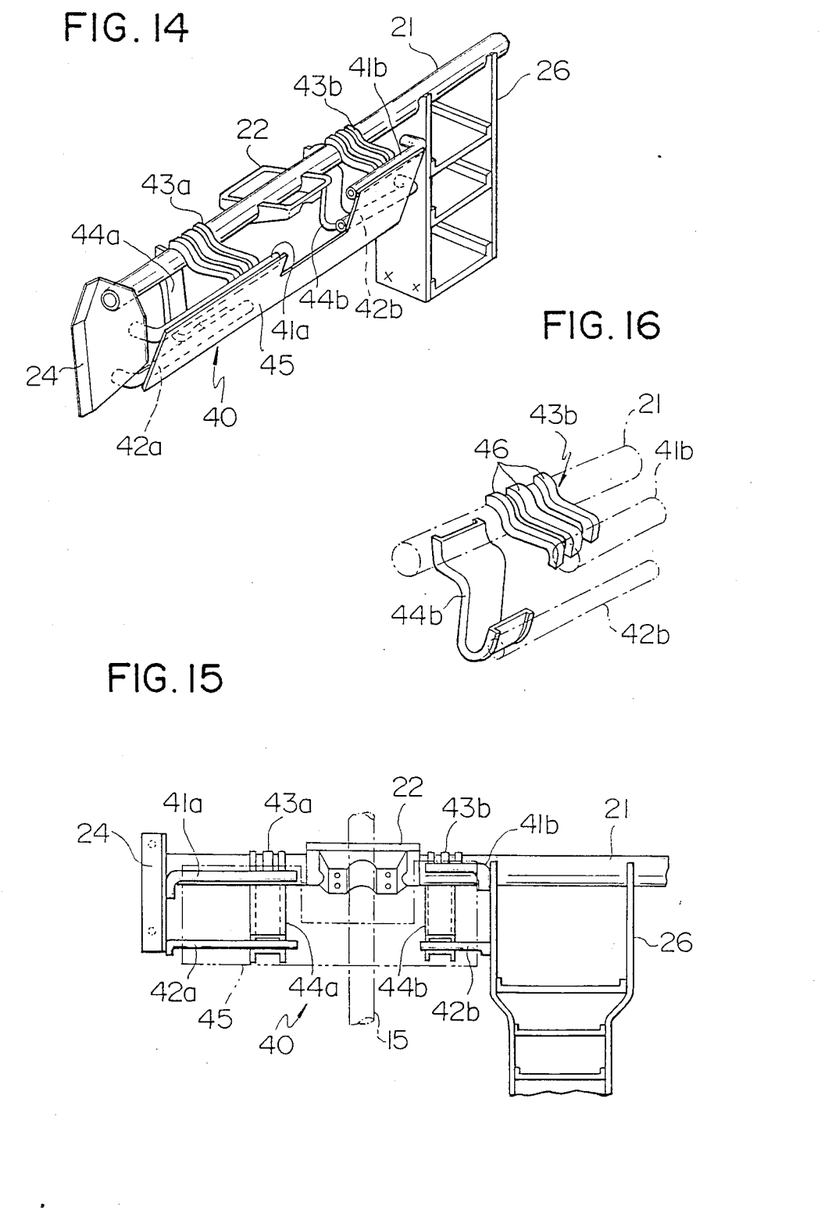
FIG. 14 is a perspective view showing a knee protector in accordance with still another embodiment of the present invention.
FIG. 15 is a plan view of the knee protector of FIG. 14.
FIG. 16 is a perspective view showing a part of the knee protector of FIG. 14.

As shown in FIGS. 14 and 15, a knee protector 40 of the illustrated embodiment is provided with a pair of first protecting members 41a, 41b of pipe shaped configurations disposed opposite sides of the steering column 15 and extending laterally, a pair of second protecting members 42a, 42b of pipe shaped configurations disposed below and in parallel with the first protecting members 41a, 41b respectively. One ends (left in FIGS. 14, 15) of the protecting members 41a, 42a are fixed to the bracket 24 for the pipe member 21. One ends (right ends in FIGS. 14, 15) of the right members 41b, 42b are fixed to a side surface of the reinforcing stay 26. The other ends (close to the steering column 15) of the first protecting members 41a, 41b are connected with one ends of first support members 43a, 43b which are fixed to upper portions of the steering support member 21 at the other ends. The other ends of the second protecting members 42a, 42b are connected with one ends of the second support members 44a, 44b which are fixed to lower portions of the steering support member 21 at the other ends.

Figure 17A:
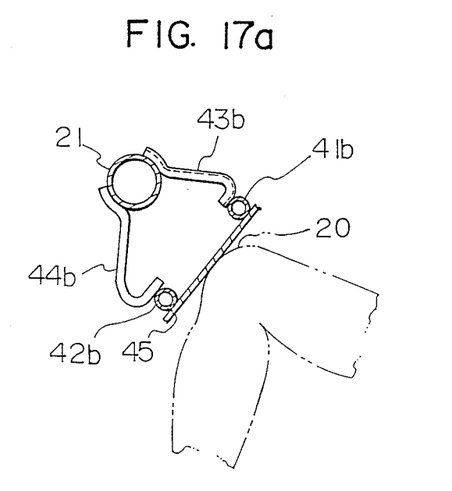
FIGS. 17a and 17b are views showing deformations of the knee protector of FIG. 14.
Figure 17B:
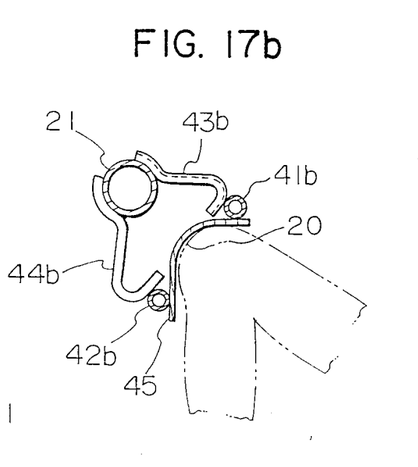

As shown in FIG. 14, there is provided a cover member 45 of a thin plate across the first and second protecting members 41 and 42. The cover member 45 is mounted on the first and second members 41 and 42 so as to face the knee 20 of the passenger M. The cover member 45 has a rigidity lower than the first and second protecting members 41 and 42 so that the cover member 45 is deformed before the protecting members 41 and 42 are deformed by the collision energy as shown in FIG. 17b. This means that the cover member 45 is deformed to be brought into contact with the knee 20 in a broad area thereof, absorbing the collision energy. The cover member 45 effects to prevent the first and second protecting members 41 and 42 from moving away from each other. Therefore, the cover member 45 is effective in not only lightening the collision impact applied to the knee 20 but also catching the knee 20 by the knee protector 40.

The first support members 43a, 43b are preferably of corrugated configurations in section as shown in FIG. 16 to increase rigidity thereof comparing with the second support members 44a, 44b. In the illustrated embodiment, the first support member 43a is provided three corrugations 46 so that the second protecting members 42a, 42b are moved forwardly greater than the first protecting members 41a, 41b. Therefore, the knee 20 is prevented from moving upwardly away from the knee protector 40.

In order to obtain the above result, the second support members 44a, 44b may be smaller in thickness than the first support members 43a, 43b to be deformed greater than the first support members 43a, 43b.

Figure 18:
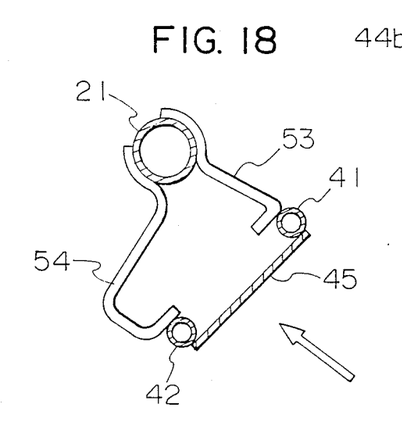
FIG. 18 is a schematic sectional view of yet another structure of knee protector.

Referring to FIG. 18, there is shown a still another embodiment of the present invention. In this embodiment, a first support member 53 extends substantially in a direction in which the knee 20 is moved in case of collision as shown by an arrow in FIG. 18. In other words, the first support member extends in a forward and upward direction of the vehicle. A second support member 54 is provided a portion extending substantially perpendicular to the direction in which the knee is moved in case of collision. With this structure, the first support member 53 is subjected to a compressive force caused by the collision. On the other hand, the second support member 54 is subjected to a bending force as the knee 20 is forced to be moved along the arrow. As a result, the second protecting member 42 is displaced greater than the first protecting member 41 in case of collision.

It will be apparent that various modifications and improvements may be made based on the above descriptions by those skilled in the art without departing from the scope of the claims as attached.

We claim:

1. A knee protector structure mounted on a front body member of a vehicle to face knees of a passenger seated in a front seat for stopping a forward movement of the passenger by the knees to lighten a collision impact applied to the passenger comprising, protecting panel means mounted on the front body member for being brought into contact with the knees in case of collision, the protecting panel means having an upper panel portion and a lower panel portion, the lower panel portion having a rigidity smaller than the upper panel portion so that the lower panel portion is deformed greater than the upper panel portion when the knees are brought into contact with the protecting panel means in case of the collision.

2. A knee protector structure as recited in claim 1 wherein the protecting panel means is provided with a pair of rectangular plate means arranged in a spaced relationship and joined at an upper and lower ends with each other for constituting a three dimensional structure.

3. A knee protector structure as recited in claim 1 wherein the lower panel portion is formed with cut out means for reducing the rigidity thereof.

4. A knee protector structure as recited in claim 1 wherein the lower panel portion is thinner than the upper panel portion in thickness.

5. A knee protector structure as recited in claim 1 wherein the upper panel portion is provided with stopper means for receiving the knees and preventing the knees from slipping out of the knee protector structure in case of the collision.

6. A knee protector structure as recited in claim 5 wherein the stopper is of a complementary configuration of the knee.

7. A knee protector structure as recited in claim 1 wherein the knee protector structure is provided for each of right and left knees of the passenger.

8. A knee protector structure as recited in claim 1 wherein the protecting panel means is disposed behind instrument panel means for mounting instruments thereon.

9. A knee protector structure as recited in claim 8 wherein the protecting panel means extends substantially in parallel with the instrument panel means.

10. A knee protector structure mounted on a front body member of a vehicle to face knees of a passenger seated in a front seat for stopping a forward movement of the passenger by the knees to lighten a collision impact applied to the passenger comprising protecting panel means for being brought into contact with the knees in case of collision, upper support means mounted on the front body member for supporting an upper panel portion of the protecting panel means and lower support means mounted on the front body member for supporting a lower panel portion of the protecting panel means, the lower support means having a rigidity smaller than the upper support means so that the lower panel portion is displaced greater than the upper panel portion when the knees are brought into contact with the protecting panel means in case of the collision.

11. A knee protector structure as recited in claim 10 wherein the upper support means is of a corrugated configuration in section to increase the rigidity relative to the lower support means.

12. A knee protector structure as recited in claim 10 wherein the upper support means extends substantially in a direction in which the knee is moved in case of collision, the lower support means having a portion extending substantially perpendicular to said direction to produce a displacement of the lower panel portion greater than that of the upper panel portion.

13. A knee protector structure as recited in claim 10 wherein the upper panel portion is provided with stopper means for receiving the knees and preventing the knees from slipping out of the knee protector structure in case of the collision.

14. A knee protector structure as recited in claim 10 wherein the protecting panel means is disposed behind instrument panel means for mounting instruments thereon.

15. A knee protector structure as recited in claim 14 wherein the protecting panel means extends substantially in parallel with the instrument panel means.

16. A knee protector structure mounted on a front body member of a vehicle to face knees of a passenger seated in a front seat for stopping a forward movement of the passenger by the knees to lighten a collision impact applied to the passenger comprising protecting means for being brought into contact with the knees in case of collision, stopper means for receiving the knee and preventing the knee from slipping out of the knee protector structure, the protecting means being movably carried by the front body member forwardly when hit by the knee.

17. A knee protector structure as recited in claim 16 further comprising support arm means mounted on the front body member for carrying the protecting means and the stopper means, the support arm means being deformed to allow the protecting means to move forwardly when hit by the knee.

18. A knee protector structure as recited in claim 17 further comprising shock absorbing means mounted on the support arm means for carrying the protecting means, the shock absorbing means being deformed to allow the protecting means to move forwardly when hit by the knee.

19. A knee protector structure as recited in claim 18 wherein the support arm means is of a corrugated configuration in section for increasing the rigidity relative to the shock absorbing means, the shock absorbing means being deformed prior to the deformation of the support arm means to allow the protecting means to move forwardly.

20. A knee protector structure as recited in claim 16 wherein the protecting means and stopper means are disposed behind instrument panel means for mounting instruments thereon, the protecting means and the stopper means extending substantially in parallel with the instrument panel means.

21. A knee protector structure mounted on a front body member of a vehicle to face knees of a passenger seated in a front seat for stopping a forward movement of the passenger by the knees to lighten a collision impact applied to the passenger comprising first protecting means for being brought into contact with the knees in case of collision, second protecting means arranged below and in parallel with the first protecting means for being brought into contact with the knees in case of the collision, the second protecting means being movably carried forwardly when hit by the knee.

22. A knee protector structure as recited in claim 21 wherein the first and second protecting means are constituted by pipe members, the first and second protecting means being arranged to receive the knee therebetween in case of the collision.

23. A knee protector structure as recited in claim 21 further comprising first support means mounted on the front body member for supporting the first protecting means, second support means mounted on the front body member for supporting the second protecting means, the second support means is smaller in rigidity than the first support means to allow the second protecting means to be displaced greater than the first protecting means in case of collision.

24. A knee protector structure as recited in claim 23 wherein the first support means is of a corrugated configuration in section to increase the rigidity relative to the second support means, panel upper support means mounted on the front body member for supporting an upper panel portion of the protecting panel means and lower support means mounted on the front body member for supporting a lower panel portion of the protecting panel means, the lower support means having a rigidity smaller than the upper support means so that the lower panel portion is displaced greater than the upper panel portion when the knees are brought into contact with the protecting panel means in case of the collision.

25. A knee protector structure as recited in claim 21 further provided with cover means connected with both the first and second protecting means for covering a space between the first and second protecting means, the cover means being deformed by the collision impact through the knee to absorb collision energy in case of the collision.

* * * * *